(12) United States Patent
Wakeham

(10) Patent No.: US 11,214,331 B2
(45) Date of Patent: Jan. 4, 2022

(54) BICYCLE COMPONENT PROVIDED WITH A TEMPERATURE-COMPENSATED STRESS/STRAIN SENSOR

(71) Applicant: Campagnolo S.r.l., Vicenza (IT)

(72) Inventor: Keith Joseph Wakeham, Calgary (CA)

(73) Assignee: Campagnolo S.r.l., Vicenza (IT)

( * ) Notice: Subject to any disclaimer, the term of this patent is extended or adjusted under 35 U.S.C. 154(b) by 0 days.

(21) Appl. No.: 16/407,639

(22) Filed: May 9, 2019

(65) Prior Publication Data

US 2019/0346318 A1 Nov. 14, 2019

(30) Foreign Application Priority Data

May 11, 2018 (IT) .......................... 102018000005299

(51) Int. Cl.

| *G01L 1/22* | (2006.01) |
| *B62J 99/00* | (2020.01) |
| *B62M 3/00* | (2006.01) |
| *B62M 1/36* | (2013.01) |
| *B62J 45/41* | (2020.01) |
| *B62J 45/411* | (2020.01) |
| *B62J 45/421* | (2020.01) |

(52) U.S. Cl.
CPC ................ *B62M 3/00* (2013.01); *B62J 45/41* (2020.02); *B62J 45/411* (2020.02); *B62J 45/421* (2020.02); *B62M 1/36* (2013.01); *G01L 1/2281* (2013.01)

(58) Field of Classification Search
CPC ..... G01L 5/225; G01L 1/2281; G01L 1/2268; G01G 3/18; G01G 3/1418; G01G 3/1457; B62J 45/40

USPC .......................................................... 73/766
See application file for complete search history.

(56) References Cited

U.S. PATENT DOCUMENTS

| 5,016,478 A | * | 5/1991 | Mercat | ...................... G01L 5/13 |
| | | | | 73/862.191 |
| 5,027,303 A | * | 6/1991 | Witte | ...................... A61B 5/222 |
| | | | | 482/8 |
| 5,319,522 A | | 6/1994 | Mehta | |
| 6,296,072 B1 | | 10/2001 | Turner | |
| 7,647,837 B2 | | 1/2010 | Moran et al. | |
| 8,006,574 B2 | | 8/2011 | Meyer | |
| 8,065,926 B2 | * | 11/2011 | Meyer | .................. G01L 3/1478 |
| | | | | 73/862.325 |

(Continued)

FOREIGN PATENT DOCUMENTS

| CN | 1724307 A | 1/2006 |
| CN | 101201284 A | 6/2008 |

(Continued)

OTHER PUBLICATIONS

Italian Search Report and Written Opinion in Italian Application No. 102018000005294, dated Jan. 15, 2019, with English translation.

(Continued)

*Primary Examiner* — Tran M. Tran
(74) *Attorney, Agent, or Firm* — Volpe Koenig

(57) ABSTRACT

A bicycle component comprising a stress/strain sensor aligned according to a stress/strain to be detected, and a temperature sensor associated with said stress/strain sensor, wherein said stress/strain sensor and said temperature sensor lie in planes that do not coincide with one another and are not parallel to each another.

20 Claims, 7 Drawing Sheets

(56) References Cited

U.S. PATENT DOCUMENTS

| | | | | |
|---|---|---|---|---|
| 8,096,173 | B2* | 1/2012 | Isono | G01M 17/021 |
| | | | | 73/146 |
| 8,800,389 | B2* | 8/2014 | Tetsuka | G01L 5/225 |
| | | | | 73/862.621 |
| 8,852,130 | B2* | 10/2014 | Govari | A61B 5/6885 |
| | | | | 600/595 |
| 8,881,608 | B2* | 11/2014 | Tetsuka | B62M 3/16 |
| | | | | 73/862.621 |
| 9,097,598 | B2* | 8/2015 | Grassi | G01L 3/04 |
| 9,182,304 | B2 | 11/2015 | Namiki et al. | |
| 9,221,440 | B2* | 12/2015 | Drennen | F16D 66/00 |
| 9,310,264 | B2* | 4/2016 | David | G01L 5/225 |
| 9,322,725 | B2* | 4/2016 | Tetsuka | G01L 5/16 |
| 9,423,310 | B2* | 8/2016 | Tetsuka | G01L 5/13 |
| 9,459,167 | B2 | 10/2016 | Heinkel et al. | |
| 9,476,294 | B2* | 10/2016 | Harman | E21B 47/06 |
| 9,488,668 | B2 | 11/2016 | Bailey et al. | |
| 9,551,623 | B2* | 1/2017 | Biermann | A63B 24/0062 |
| 9,581,508 | B2* | 2/2017 | Tetsuka | G01L 17/00 |
| 9,599,526 | B2* | 3/2017 | Mercat | G01L 3/1457 |
| 9,784,628 | B1 | 10/2017 | Jennings et al. | |
| 9,810,593 | B2* | 11/2017 | Carrasco Vergara | B62M 3/003 |
| 9,829,402 | B2* | 11/2017 | Beason | G01K 13/00 |
| 9,921,118 | B2* | 3/2018 | Lull | B62M 3/00 |
| 9,969,451 | B2* | 5/2018 | Sasaki | B62M 3/086 |
| 10,000,253 | B1* | 6/2018 | Tetsuka | B62M 3/00 |
| 10,076,681 | B2* | 9/2018 | Lull | A63B 21/4034 |
| 10,286,978 | B1* | 5/2019 | Chen | B62M 3/16 |
| 10,591,371 | B2* | 3/2020 | D'Elia | G01L 5/0019 |
| 2003/0137046 | A1 | 7/2003 | Kageyama | |
| 2005/0145061 | A1 | 7/2005 | Ording et al. | |
| 2005/0199092 | A1 | 9/2005 | Feltrin et al. | |
| 2007/0186719 | A1 | 8/2007 | Ciavatta et al. | |
| 2008/0236293 | A1 | 10/2008 | Meggiolan | |
| 2008/0257056 | A1 | 10/2008 | Smetana | |
| 2009/0120210 | A1 | 5/2009 | Phillips et al. | |
| 2010/0162830 | A1* | 7/2010 | Meuter | G01L 3/1457 |
| | | | | 73/862.321 |
| 2010/0220963 | A1 | 9/2010 | Tamura et al. | |
| 2010/0263468 | A1 | 10/2010 | Fisher et al. | |
| 2011/0135474 | A1* | 6/2011 | Thulke | G01L 1/2218 |
| | | | | 416/61 |
| 2012/0169154 | A1 | 7/2012 | Curodeau | |
| 2012/0214646 | A1 | 8/2012 | Lull et al. | |
| 2012/0330572 | A1* | 12/2012 | Longman | G01L 3/247 |
| | | | | 702/44 |
| 2013/0205916 | A1 | 8/2013 | Kodama et al. | |
| 2013/0283969 | A1 | 10/2013 | Watarai | |
| 2013/0333489 | A1 | 12/2013 | David et al. | |
| 2015/0239499 | A1 | 8/2015 | Lan | |
| 2015/0247767 | A1 | 9/2015 | Tetsuka | |
| 2016/0003696 | A1 | 1/2016 | Longman et al. | |
| 2016/0031523 | A1 | 2/2016 | Tetsuka et al. | |
| 2016/0052583 | A1 | 2/2016 | Sasaki | |
| 2016/0295702 | A1 | 10/2016 | Heikkinen et al. | |
| 2016/0311491 | A1 | 10/2016 | Watarai | |
| 2017/0127581 | A1 | 5/2017 | Figueredo et al. | |
| 2017/0247078 | A1 | 8/2017 | Tetsuka | |
| 2017/0248420 | A1 | 8/2017 | Fyfe et al. | |
| 2017/0356816 | A1 | 12/2017 | D'Elia et al. | |
| 2018/0290714 | A1 | 10/2018 | Fossato et al. | |
| 2019/0099119 | A1* | 4/2019 | Wakeham | A61B 5/221 |

FOREIGN PATENT DOCUMENTS

| | | |
|---|---|---|
| CN | 101290026 A | 10/2008 |
| CN | 201201674 Y | 3/2009 |
| CN | 102589772 A | 7/2012 |
| CN | 103612702 A | 3/2014 |
| CN | 204527067 U | 8/2015 |
| CN | 205156906 U | 4/2016 |
| CN | 106335591 A | 1/2017 |
| CN | 107290086 A | 10/2017 |
| CN | 207019821 U | 2/2018 |
| EP | 1 486 413 A2 | 12/2004 |
| EP | 1 818 252 A1 | 8/2007 |
| EP | 1 978 342 A2 | 10/2008 |
| EP | 1 407 239 B1 | 1/2009 |
| EP | 2 058 637 A2 | 5/2009 |
| EP | 2805141 B1 | 11/2014 |
| JP | H08145824 A | 6/1996 |
| WO | 2011/030215 A1 | 3/2011 |
| WO | 2015/095933 A1 | 7/2015 |
| WO | 2016/030859 A1 | 3/2016 |
| WO | 2017/165448 A1 | 9/2017 |

OTHER PUBLICATIONS

Italian Search Report and Written Opinion in Italian Application No. 102018000005297, dated Mar. 4, 2019, with English translation.
Italian Search Report and Written Opinion in Italian Application No. 102018000005299, dated Jan. 21, 2019, with English translation.
Italian Search Report and Written Opinion in Italian Application No. 102018000005302, dated Jan. 23, 2019, with English translation.
Italian Search Report and Written Opinion in Italian Application No. 102018000007266, dated Mar. 22, 2019, with English translation.
Ron/Spinningmagnets; "Electric bicycles are adopting a new standard for connectors: ELECTRICBIKE.COM" published on Dec. 6, 2013. Retrieved from the Internet: URL: https://www.electricbike.com/ropdenergybus-charging-port-standard/ (accessed on May 3, 2019).
Chinese Office Action for Application No. 201910389220.0, dated Aug. 11, 2021, with English translation.
Chinese Office Action for Application No. 201910388132.9, dated Aug. 17, 2021, with English translation.
Office Action dated Oct. 11, 2021 in corresponding Chinese Application CN 201910389229.1.

* cited by examiner

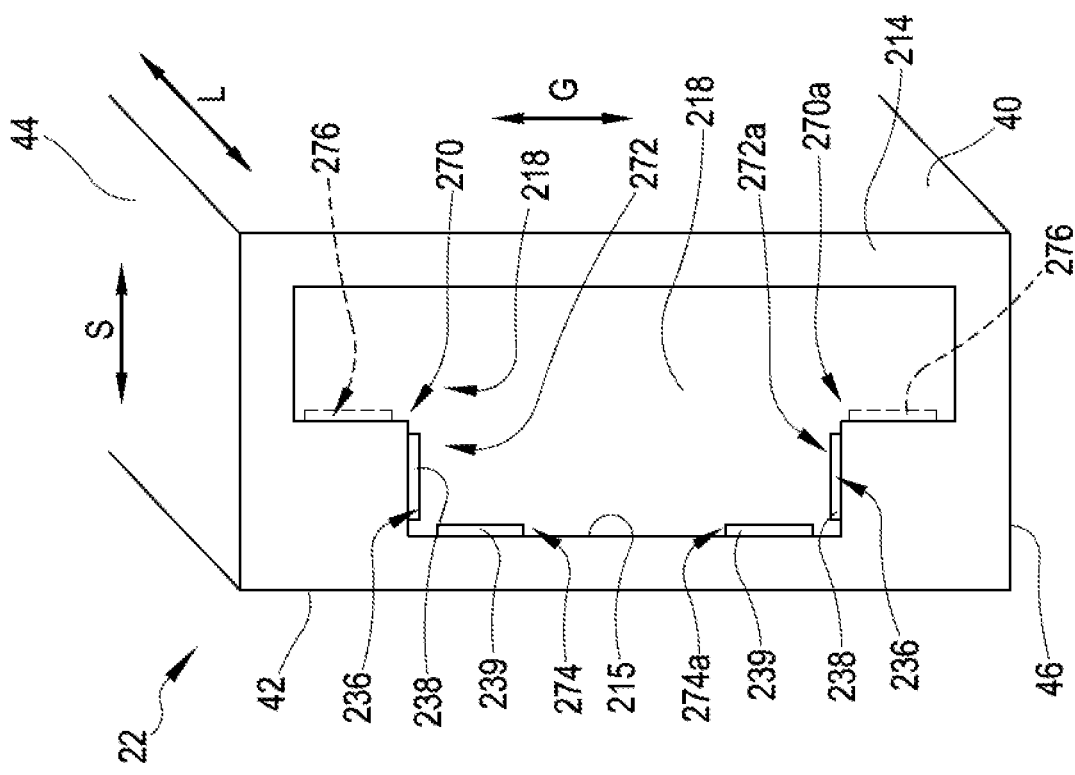
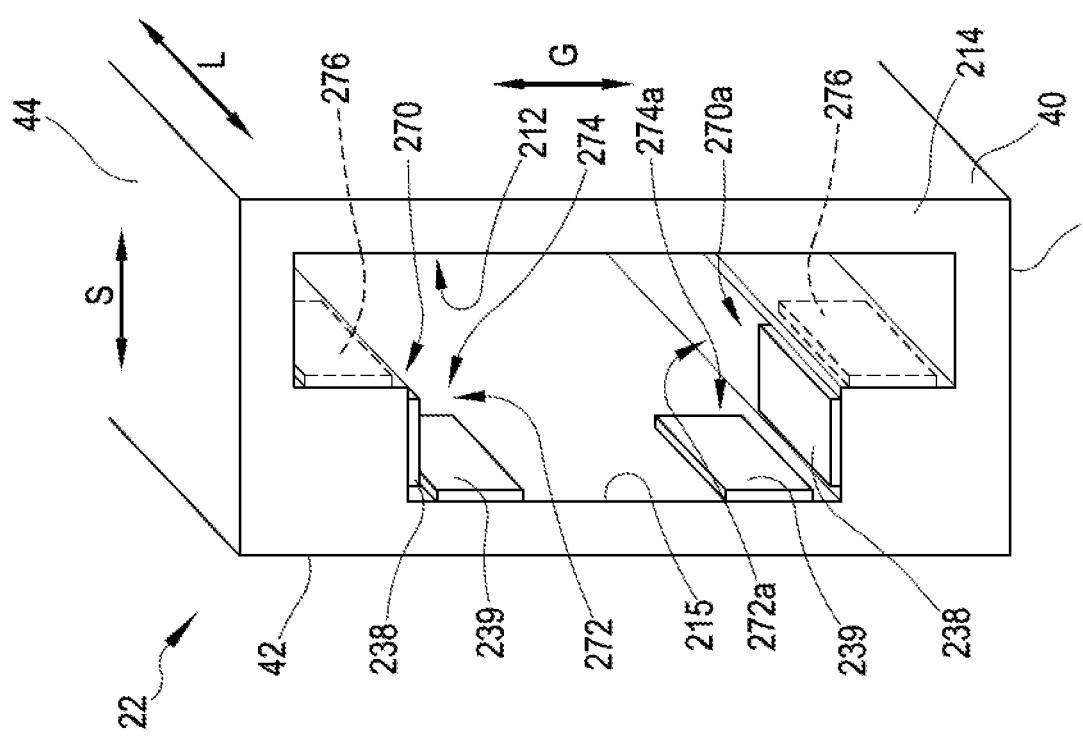

BICYCLE COMPONENT PROVIDED WITH A TEMPERATURE-COMPENSATED STRESS/STRAIN SENSOR

CROSS REFERENCE TO RELATED APPLICATION

This application claims the benefit of Italian Application No. 102018000005299, filed on May 11, 2018, which is incorporated herein by reference as if fully set forth.

FIELD OF INVENTION

The invention relates in general to a bicycle component provided with a temperature-compensated stress/strain sensor. In particular, the invention relates to a bicycle component comprising at least one stress/strain sensor and at least one temperature sensor.

BACKGROUND

The general knowledge in the field of the detection of stresses in a bar, as typically used in the context of the measurement of the torque applied to a crankarm of a crankset of a bicycle, typically provides for the use of at least one strain gage, typically of two strain gages, one positioned on one side with respect to the neutral plane of the crankarm with respect to the useful component of the pedaling force, and the other positioned on the opposite side with respect to the neutral plane.

Considering the crankarm with the pedal axis in front position (in the travel direction) with respect to the rotation axis, and therefore in the "downstroke" (the most effective part of the pedaling cycle), the strain gage that is in top position is subjected to and detects a dilation or elongation, while the strain gage that is in bottom position detects a contraction or compression when the cyclist applies a force on the pedal.

In case of other components of the bicycle and in particular of the crankset, such as the spider of the right (more in general on the transmission chain/belt side) crankarm or the bottom bracket spindle or the free wheel body of a monolithic cogset associated with the hub of the rear wheel, it is similarly known to use two strain gages (or two pairs of strain gages) positioned in two different positions, such that when one is subjected to and detects a dilation or elongation, the other one detects a contraction or compression.

It is also known in general to provide, in each measuring position, for a further strain gage the tracks of which are oriented parallel with respect to the tracks of the active strain gage, the role of this parallel strain gage being that of increasing the precision of the measurement reading; or a further strain gage the tracks of which are oriented at 90° with respect to the tracks of the active strain gage, the role of this orthogonal strain gage being that of compensating for the changes in resistance in the active strain gage caused by changes in temperature and/or that of increasing the precision of the measurement reading, by detecting the elongations/shortenings due to the Poisson effect.

A reading device, typically comprising a Wheatstone bridge circuit, takes care of reading the outputs of the strain gage or of the strain gages, suitably combining them.

It is also in general known to compensate a measurement of stresses/strains with a temperature measurement.

U.S. Pat. No. 7,647,837 B2 and EP1407239B1 disclose temperature-compensated strain gage detection systems, without however any reference to the application to bicycles.

In both cases, a temperature sensor is arranged at each strain gage. The U.S. document recognizes that the temperature can change not only the properties of a strain gage element, rather also the properties of the base material to which the strain gage is attached, and that differences in the expansion coefficient between the strain gage and the base material can cause errors in the measurement. In FIG. 2, such a document suggests to position the temperature sensors in the same plane as the strain gages. In the European document, the strain gage and the temperature sensor overlap each other and are therefore in planes parallel and immediately adjacent to one another.

The Applicant observes that, while for a strain gage (or other stress/strain sensor) that has to detect mechanical stresses/strains, the detection capability is maximized when it is positioned on surfaces—and more in general in planes—of the component under measurement subjected to high mechanical stresses, vice-versa it is appropriate for the temperature sensor to be affected as little as possible by the mechanical stresses/strains acting on the component, since its reading could otherwise be changed and not very reliable.

The technical problem at the basis of the invention is therefore to provide a bicycle component comprising such sensors that allows a measurement of stresses/strains that is particularly accurate and independent from the temperature.

SUMMARY

The present solution provides a bicycle component with a stress or strain sensor and an associated temperature sensor that are arranged so that the stress or strain sensor and an associated temperature lie in planes that do not coincide with one another and are not parallel to each another.

BRIEF DESCRIPTION OF THE DRAWINGS

Further features and advantages of the invention will be more clearly apparent from the description of preferred embodiments thereof, made with reference to the attached drawings, wherein:

FIGS. 10 and 11 are perspective cross sectional views of a crankarm, seen from the free end, according to a different embodiment, according to two alternatives.

DETAILED DESCRIPTION OF THE PREFERRED EMBODIMENTS

Figure 1:
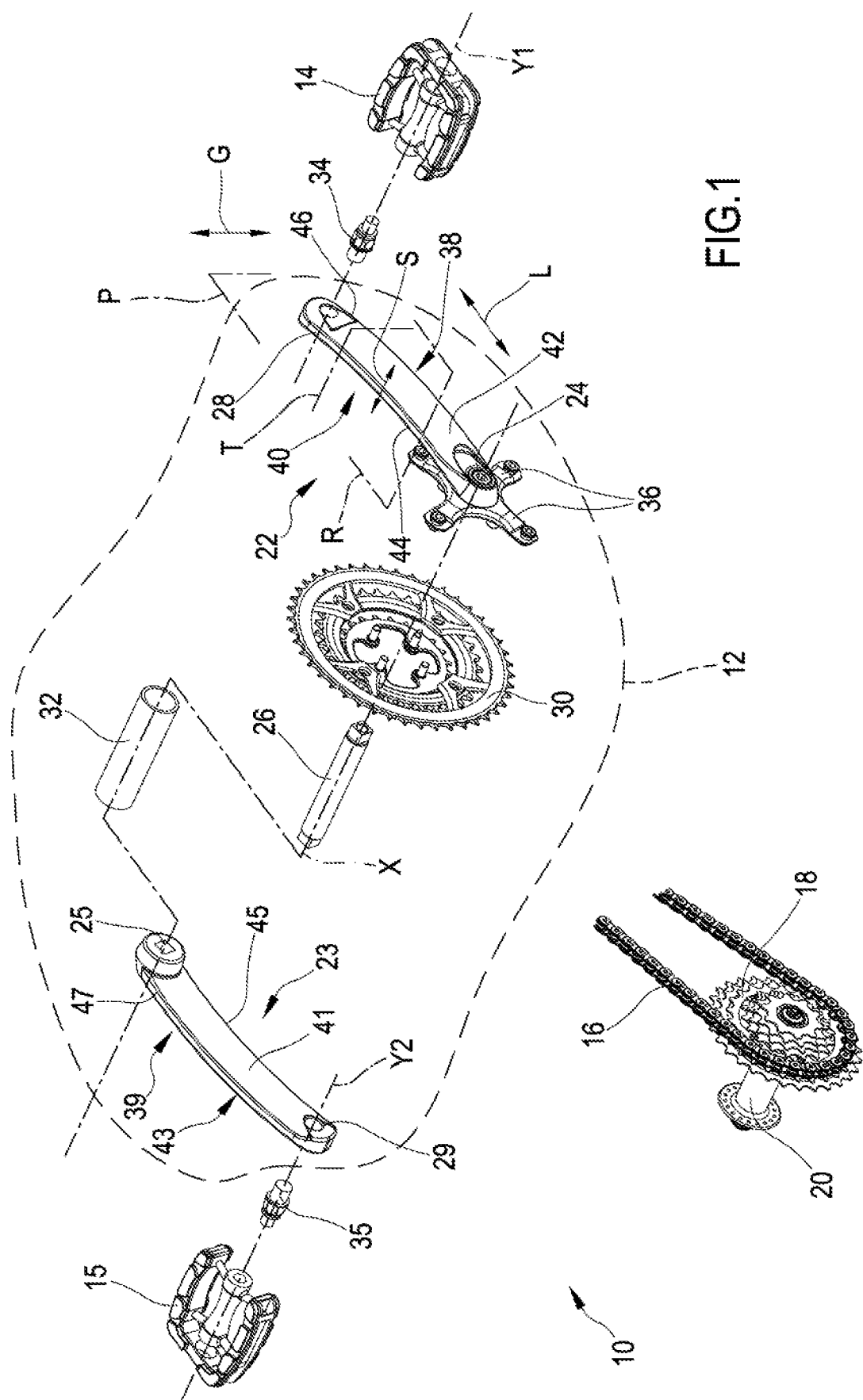
FIG. 1 schematically illustrates a bicycle transmission.

In the present description and in the attached claims, as well as in general in the mechanical field, under the term "neutral axis" it is meant to indicate the geometric locus of the points in which the stresses normal to the cross section of the solid—in this case the crankarm—under consideration are zero. Under the term "neutral plane" it is meant to indicate the geometric locus of the points belonging to the neutral axis of every cross section, which in practice can also diverge from a geometric plane.

In one aspect, the invention relates to a bicycle component comprising a stress/strain sensor aligned according to a stress/strain to be detected, and a temperature sensor associated with said stress/strain sensor, wherein said stress/strain sensor and said temperature sensor lie in planes that do not coincide with one another and are not parallel to each other.

In the present description and in the attached claims, under the expression "plane", a plane approximating the substantially two-dimensional shape of the sensor is meant to be indicated.

This configuration makes the temperature sensor less subjected to the mechanical stresses to which the stress/strain sensor is subjected, which are on the other hand high in the plane of the stress/strain sensor and in the planes parallel thereto, thus improving the reliability of the temperature measurement, and consequently improving the reliability of the temperature-compensated stress/strain measurement, still not precluding keeping the temperature sensor in the vicinity of the stress/strain sensor.

Preferably, said planes are substantially orthogonal to each other.

In the present description and in the attached claims, under "substantially orthogonal" planes, planes forming an angle comprised between 80° and 100° are meant to be indicated.

The temperature sensor and the stress/strain sensor are associated in general from the logic point of view, in the sense that the reading of the temperature sensor is used to temperature-compensate the reading of the stress/strain sensor.

Preferably, moreover, the temperature sensor is thermally matched to the stress/strain sensor.

Preferably, the stress/strain sensor and the temperature sensor are positioned in a substantially isothermal region of the bicycle component.

In the present description and in the attached claims, under "substantially isothermal region", a region is meant to be indicated in which, in normal conditions of use, a maximum thermal excursion is contained within one tenth of a Celsius degree.

Preferably, the stress/strain sensor has a detection direction aligned according to said stress/strain to be detected, and the plane in which the temperature sensor lies is not orthogonal to said detection direction, being more preferably orthogonal to the plane in which the stress/strain sensor lies.

Preferably, the bicycle component is a crankarm comprising a main body extending along a length direction between a rotation axis and a pedal axis, said main body carrying said stress/strain sensor and temperature sensor.

Preferably, the stress/strain sensor is a strain gage.

In the present description and in the attached claims, under "strain gage", an electrical resistance strain gage is meant to be indicated.

When the component is a crankarm, more preferably, the strain gage is oriented (namely has its detection direction) along the length direction of the crankarm.

Preferably, the temperature sensor is a thermistor, even more preferably a coil thermistor.

A thermistor (or thermoresistance) is a resistor the resistance value of which changes significantly as the temperature changes.

When the component is a crankarm, preferably the temperature sensor is oriented along the length direction of the crankarm.

In embodiments, at least one of and preferably both the stress/strain sensor and the temperature sensor is/are applied to an outer surface of the component, irrespective of whether the component is solid or hollow.

Alternatively, the component can comprise a cavity and a shell of composite material, comprising structural fiber incorporated in a polymeric matrix, extending around said cavity, at least one of, and preferably both, the stress/strain sensor and the temperature sensor being applied to an inner surface of the shell.

Alternatively, the component can comprise a core and a shell of composite material, comprising structural fiber incorporated in a polymeric matrix, extending around said core, at least one of, and preferably both, the stress/strain sensor and the temperature sensor being arranged between the core and the shell.

In that case, the section of the component is solid, at least in the region containing said sensors. If the core is also made of composite material, both faces of the sensor(s) are in contact with the composite material.

Preferably, said core comprises at least one recess, and said at least one of, and preferably both, the stress/strain sensor and the temperature sensor is/are arranged in said at least one recess. In this way, its/their positioning is particularly precise.

In both cases, preferably the structural fiber is selected from the group consisting of carbon fibers, glass fibers, boron fibers, synthetic fibers, ceramic fibers and combinations thereof.

Preferably, the synthetic fibers comprise polyoxazole fibers, for example Zylon®, ultra high molecular weight polyethylene fibers, for example Dyneema®, aramid fibers, for example kevlar fibers and combinations thereof.

In both solutions with either cavity or core, preferably the stress/strain sensor is arranged on a first region of an inner surface of the shell, the temperature sensor is arranged on a second region of the inner surface of the shell, said first region being substantially orthogonal to said second region.

In the present description and in the attached claims, under "inner surface" of the shell, the surface facing towards the cavity or respectively the core is meant to be indicated.

The shell made of composite material preferably has an inner projection, more preferably along an inner edge of the shell, and at least one of the first and the second region is made on said projection.

Preferably, the projection is formed by a cord of composite material preferably comprising substantially unidirectional structural fiber incorporated in a polymeric matrix.

More preferably, said first region, and possibly also said second region, extends along said direction of stress/strain to be detected.

When the component is oblong and in particular it is a crankarm, preferably the first region of the inner surface of the shell substantially extends along the length direction and along a thickness direction of the crankarm, and the second region of the inner surface of the shell substantially extends along the length direction and along a width direction of the crankarm.

Preferably, the stress/strain sensor is applied in the first region, in a first position along the length direction of the component.

Preferably, the stress/strain sensor is arranged on the aforementioned projection, which also acts as a reinforcement of the component, and, in case the projection is formed by the aforementioned cord comprising substantially unidirectional structural fiber, the stress/strain sensor is advantageously arranged oriented according to a fiber direction of the composite material of the crankarm.

Preferably, in this case the temperature sensor is applied in the second region of the inner surface of the shell, substantially in the first position along the length direction of the component.

More preferably, the second region of the inner surface of the shell is a distal region.

In the present description and in the attached claims, under "proximal" a region or surface or face is meant to be indicated that, in the mounted condition, generically faces towards the frame; under "distal" a region or surface or face opposite to the proximal one is meant to be indicated.

Preferably, the bicycle component further comprises a second stress/strain sensor and a second temperature sensor, lying in planes not coinciding with one another and not parallel to each other, more preferably substantially orthogonal to each other.

All of what has been described above with reference to the stress/strain sensor, hereinafter called first, and to the temperature sensor, hereinafter called first, is also valid for the second stress/strain sensor and for the second temperature sensor.

The first and the second stress/strain sensor can lie substantially in one and the same plane, but preferably, the first and the second stress/strain sensor lie in planes substantially parallel to one another.

In the present description and in the attached claims, under "substantially parallel" planes, planes that are perfectly parallel or forming an angle comprised between −10°/350° and 10° are meant to be indicated.

The first and the second temperature sensor can lie in planes substantially parallel to one another, but preferably they lie substantially in one and the same plane.

Preferably, the second stress/strain sensor is arranged on a third region of an inner surface of the shell, the second temperature sensor is arranged on a fourth region of the inner surface of the shell, said third region being substantially orthogonal to said fourth region, wherein the first and the second region are made at a first inner edge of the shell, and the third and the fourth region are made at a second inner edge of the shell, adjacent to the first edge.

Preferably, the shell of composite material has a second inner projection, more preferably along an inner edge of the shell, and at least one of the third and the fourth region is made on said second projection.

All of what has been described above with reference to the projection, hereinafter called first, is also valid for the second projection; moreover, what has been described above with reference to the positioning of the first stress/strain sensor and of the first temperature sensor with respect to the projection is also valid for the positioning of the second stress/strain sensor and of the second temperature sensor with respect to the projection.

Preferably, the first projection and the second projection are formed at the two longitudinal edges of a distal face of the inner surface of the shell of composite material.

With the aforementioned preferred positioning, in a crankarm the stress/strain sensors are close and parallel to the top and bottom faces of the crankarm, namely they are in a top, respectively bottom position, when the crankarm is in the downstroke, namely with a free end forwards in the direction of travel with respect to a pivot end.

In one aspect, the invention relates to a bicycle crankarm comprising a main body extending along a length direction between a rotation axis and a pedal axis, comprising a stress/strain sensor having a detection direction aligned according to a stress/strain to be detected, and a temperature sensor, wherein said stress/strain sensor and said temperature sensor are positioned in a substantially isothermal region of the bicycle crankarm, and wherein said temperature sensor lies in a plane of the main body of the crankarm substantially orthogonal to a plane of the main body of the crankarm in which the stress/strain sensor lies, and not orthogonal to said detection direction.

Advantageous features of the crankarm are those defined above for the bicycle component.

In another aspect, the invention relates to a bicycle crankset comprising a component, in particular a crankarm, according to one of the aforementioned aspects.

In another aspect, the invention relates to a core for manufacturing a bicycle component made of composite material comprising structural fiber incorporated in a polymeric matrix, comprising a first surface and a second surface lying on planes not coinciding with each other and not parallel to each other, preferably substantially orthogonal to each other, a first recess on said first surface configured to receive a stress/strain sensor, and/or a second recess on said second surface configured to receive a temperature sensor.

In this way, the positioning of the sensors in the bicycle component is particularly precise.

Preferably, the recesses, if both are present, are made in a region of the core that corresponds to a substantially isothermal region of the bicycle component made through the core.

Preferably, said first surface is a riser surface of a step defined on the core.

In this case, preferably said second surface is a distal face of the core.

Alternatively or additionally, said second surface is a tread surface of the step defined on the core.

Preferably, said step defines a recess configured to define an inner projection in a shell of composite material formed around said core.

More preferably, the core comprises a second step opposite the first step and comprising at least one recess to receive a second stress/strain sensor and/or a second temperature sensor.

In another aspect, the invention relates to a method for detecting stresses/strains acting in a bicycle component, comprising the steps of:

a) measuring, through a stress/strain sensor, a stress/strain value, preferably in a first substantially isothermal region of the bicycle component;

b) measuring, through a temperature sensor, a temperature value, preferably in the substantially isothermal region of the bicycle component;

c) carrying out compensation operations of the stress/strain value detected in step a) using the temperature value detected in step b);

characterized in that the measurement of the stress/strain value of step a) is carried out in a first plane, and the measurement of the temperature value of step b) is carried out in a second plane, the first and the second plane being not coinciding with each other and not parallel to one another, and preferably being substantially orthogonal to each other.

Preferably, the first stress/strain sensor used in step a) is a strain gage.

Preferably, the first temperature sensor used in step b) is a thermistor.

Preferably, the method comprises the further steps of:

a1) measuring, through a second stress/strain sensor, a stress/strain value in a second, preferably substantially isothermal, region of the bicycle component;

b1) measuring, through a second temperature sensor, a temperature value, preferably in the second substantially isothermal region of the bicycle component;

c1) carrying out compensation operations of the stress/strain value detected in step a1) using the temperature value detected in step b1);

wherein the measurement of the stress/strain value of step a1) is carried out in a third plane, and the measurement of the temperature value of step b1) is carried out in a fourth plane, the third and the fourth plane being not coinciding with each other and not parallel to one another, preferably being substantially orthogonal to each other.

Preferably, the first and the third plane are parallel or coincide.

Preferably, the second and the fourth plane are parallel or coincide.

Preferably, the crankarm manufacturing process comprises the step of providing a core of a predetermined shape, applying said stress/strain sensor and said temperature sensor to the core, and covering the component being processed with the composite material, so as to create a crankarm in which the composite material is in the form of a shell or cladding.

The core can stay in the molded crankarm, but preferably the core is made of low melting point material, and the process comprises the step, carried out once hardening has occurred, of making a hole in the crankarm, heating up to a temperature comprised between the melting point of the material of the core and the hardening point of the composite material, and letting the molten core come out from the hole.

In the present description and in the attached claims, the expression "harden" is meant to be broadly understood not only to indicate the hardening of thermoplastic polymers, but to also encompass the cross-linking of thermosetting polymers.

Preferably, if the core is made of low melting point material, the process further comprises a step of washing the cavity left by the molten core with a chemical agent, provided that it does not damage said sensors.

Preferably, said core comprises at least one recess and in said step of applying said sensors on the core, said sensors are applied in a respective recess.

With reference now to FIG. 1, there is shown a bicycle transmission 10 which is a mechanism that converts the motion applied by the cyclist into rotary motion used to move the rear wheel.

A crankset 12 is the component of the transmission 10 of a bicycle that converts the motion applied to the pedals 14, 15 by the cyclist into rotary motion used to move the transmission chain 16 (in other cases, the belt), which in turn moves the rear wheel.

Besides the crankset 12, the transmission 10 further comprises the pedals 14, 15, the aforementioned chain 16 (or belt), and one or more sprockets 18 at the hub 20 of the rear wheel.

It should be emphasized that slightly different terminology from that used here is also in use; for example the pedals 14, 15 can be considered part of the crankset.

The crankset 12 comprises in general two crankarms 22, 23, each having a pivot end 24, 25 configured for coupling with a bottom bracket spindle 26 or axle of the crankarms 22, 23, and a free end 28, 29, opposite the pivot end 24, 25, configured for coupling with the pedal 14, 15; as well as at least one chainring 30 (three being shown as an example) fixed to the crankarm 22 on the chain side, integrally rotating (rotating as a unit) therewith.

Typically, the motion transmission 10 is mounted on the bicycle with the transmission chain 16 (and the chainring(s) 30 of the crankset 12 and the sprocket(s) 18 at the hub 20 of the rear wheel) on the right side; less often it is mounted with transmission chain 16, chainring(s) 30 and sprocket(s) 18 arranged on the left side of the bicycle.

For the sake of brevity the expression "on the transmission side" will sometimes be simplified hereinafter by the specific term "on the chain side" and sometimes further simplified by the specific term "right", in any case also a belt transmission and also a left crankarm in the case of an atypical mounting of the transmission being meant to be encompassed. Similarly, the expression "on the side opposite to the transmission side" will sometimes be simplified to "on the side opposite to the chain side" and sometimes further simplified by the specific term "left", in any case also a belt transmission and also a right crankarm in the case of an atypical mounting of the transmission being meant to be encompassed.

A component called bottom bracket 32 allows the rotation of the bottom bracket spindle 26 itself with respect to the bicycle frame in at least one direction; namely, the bottom bracket 32 forms the connection element of the crankset 12 to the frame.

The axis of the bottom bracket spindle 26 is also indicated hereinafter as rotation axis X, and is horizontal in the normal travel condition of the bicycle, in levelled rectilinear motion.

In the bottom bracket 32, the spindle 26 is rotationally supported about the rotation axis X through suitable bearings.

For the connection of each pedal 14, 15 to the respective crankarm 22, 23, suitable pivotal connection means are provided that allow the pedal 14, 15 to freely rotate around an axis called pedal axis Y1, Y2 herein, which in turn rotates about the rotation axis X with the crankarm 22, 23.

The connection between crankarm 22, 23 and respective pedal 14, 15 is typically of the pin/hole type or of another type that preferably allows the rotation of the pedal 14, 15 around the axis Y1, Y2 with respect to the crankarm 22, 23. The pedal pivot 34, 35 can be fixedly connected to the free end 28, 29 of the crankarm 22, 23 and the hole can be made in the pedal 14, 15. Alternatively, the pedal pivot 34, 35 can be fixedly connected to the pedal 14, 15 and the hole can be made at the free end 28, 29 of the crankarm 22, 23. As a further alternative, it is possible to provide for two holes, at the free end 28, 29 of the crankarm 22, 23 and on the pedal 14, 15, suitable for receiving a bolt or a screw.

The connection between crankarm 22, 23 and a respective axially outer end of the bottom bracket spindle 26 is of a type that makes them integrally rotate (rotate as a unit), and prevents the axial sliding of the crankarms 22, 23 with respect to the spindle 26.

A crankarm 22, 23 can be made as a single piece with the spindle 26, the other crankarm 23, 22 being coupled to the other end of the spindle 26 after the insertion of the latter in the bottom bracket 32. Alternatively, each crankarm 22, 23 can be made as a single piece with a respective spindle element, the two spindle elements being connected to one another end-to-end. As a further alternative, both crankarms 22, 23 can be coupled to a spindle 26 not in one piece.

For one or both of the crankarms 22, 23 there can for example be a screw matching, a force fitting, in particular through splined fitting, a square pin and hole matching, a gluing, or a welding.

The (typically right) crankarm 22 on the chain side 16 comprises means for fixing said chainrings 30 intended to engage, one at a time, with the chain 16. Typically, a plurality of spider legs 36 are provided for (indicated as a whole as spider), that extend radially, at the pivot end 24 of the right crankarm 22, typically as one piece with the crankarm 22; at the free ends of the spider legs 36, the chainring(s) 30 is(are) typically screwed in. Alternatively, the chainrings 30 can be made as a single piece with the right crankarm 22.

The main body or "arm region" 38, 39 of each crankarm 22, 23, namely a portion thereof extending between the rotation axis X and the pedal axis Y1, Y2 and therefore disregarding the aforementioned spider 36, is generically shaped like a bar (or rectangular parallelepiped) extending orthogonal (and cantilevered) to the rotation axis X. For the sake of brevity, hereinafter the expression "crankarm" will sometimes be used, meaning in particular the bar-shaped main body 38, 39 thereof.

More in particular, the main body 38, 39 of the crankarm 22, 23 extends in a generically radial direction with respect to the rotation axis X—under generically it being meant that it can also deviate, in one or more points as well as along the entire extension thereof, from such a direction. Each crankarm 22, 23 can indeed be more or less tapered/countersunk, when seen along a direction parallel to the rotation axis X, and/or more or less angled when seen along a direction orthogonal to the rotation axis X.

In the present description and in the attached claims, under rotation plane P of the crankarm 22, 23, any plane orthogonal to the pedal axis Y1, Y2 and to the rotation axis X is meant to be indicated, in particular one of the median planes of the crankarm 22, 23.

In the present description and in the attached claims, under rotary plane R of the crankarm 22, 23 or axes plane, the plane containing the rotation axis X and the pedal axis Y1, Y2 is meant to be indicated. In particular, under rotary plane R, one of the median planes of the crankarm 22, 23 is meant to be indicated.

With reference to such a schematization of the crankarm 22, 23 as a bar, in the present description and in the attached claims, under length direction L of the crankarm 22, 23, a direction orthogonally joining the rotation axis X to the pedal axis Y1, Y2 is meant to be indicated; the length direction L lies in particular in the rotary plane R.

In the present description and in the attached claims, under transversal plane T to the crankarm 22, 23, any plane orthogonal to the length direction L is meant to be indicated. In particular, under transversal plane T, one of the median planes of the crankarm 22, 23 is meant to be indicated.

In the present description and in the attached claims, under cross section of the crankarm 22, 23, a section taken through the main body 38, 39 of the crankarm 22, 23 in a transversal plane T is meant to be indicated. The cross section of each crankarm 22, 23 (in the arm region 38 for the right crankarm 22) is generically rectangular, but it can be of any type, although it typically has at least one axis of symmetry. The shape and size of such a cross section can be constant along the entire length of the crankarm 22, 23 or they can change. The cross section of each crankarm 22, 23 can be solid or hollow.

In the present description and in the attached claims, under width direction G of the crankarm 22, 23, a direction lying in the rotation plane P and orthogonal to the length direction L of the crankarm 22, 23 is meant to be indicated; the width direction G lies in a transversal plane T.

In the present description and in the attached claims, under thickness direction S of the crankarm 22, 23, a direction parallel to the rotation axis X is meant to be indicated; the thickness direction S lies in a transversal plane T and in the rotation plane R.

For the sake of clarity, in FIG. 1 these planes and these directions are only shown on the right crankarm 22.

As stated above, in the present description and in the attached claims, under proximal face 40, 41 of the crankarm 22, 23, the face that, in the mounted condition, faces towards the frame is meant to be indicated; under distal face 42, 43 of the crankarm 22, 23, the face opposite the proximal face 40, 41 is meant to be indicated. The bottom bracket spindle 26 extends from the proximal face 40, 41, and the pedal pivot 34, 35 extends from the distal face 42, 43.

In the present description and in the attached claims, under upper face 44, 45 and lower face 46, 47, respectively, of the crankarm 22, 23, the faces substantially orthogonal to the proximal face 40, 41 and to the distal face 42, 43 are meant to be indicated, extending along the length direction L and the thickness direction S, which are located in upper and lower position, respectively, when the crankarm 22, 23 is in the downstroke, namely with the free end 28, 29 forwards in the travel direction with respect to the pivot end 24, 25.

In the present description and in the attached claims, in the case of a hollow crankarm 22, 23 (at least along the arm region or main body 38, 39 thereof), under inner surface of the crankarm 22, 23, the surface facing towards the cavity is meant to be indicated (analogously to what has been stated above with reference to the shell of composite material); under outer surface of the crankarm 22, 23, the exposed surface is meant to be indicated.

During pedaling, the force applied by the cyclist on the pedals 14, 15 is transferred from the latter to the crankarms 22, 23.

The left crankarm 23 transfers such a force to the bottom bracket spindle 26. The bottom bracket spindle 26 transfers such a force—apart from the losses by friction with the bottom bracket 32—to the right crankarm 22.

The force directly applied to the right crankarm 22 or transmitted thereto by the left crankarm 23 as stated above is transferred to the spider 36 of the right crankarm 22, and therefrom to the chainrings 30.

From the chainrings 30, the force is transmitted to the transmission chain 16, and therefrom to the cogset 18 that, finally, transfers it to the hub 20 of the rear wheel, through the free wheel body of the cogset 18, if present.

In each of the aforementioned components of the transmission 10 stresses and corresponding strains are therefore generated, which can be a more or less accurate indication of the force delivered by the cyclist, besides possibly being of interest in any case, for example in the step of designing the various components.

More in particular, pedaling is a cyclical movement with which the cyclist applies, with each leg on the respective pedal 14, 15, such a force as to set the crankset 12 into rotation, consequently moving the rear wheel through the chain 16 and the cogset 18.

During pedaling, the force (F in FIG. 2) applied on the pedals 14, 15 by the cyclist changes in terms both of intensity and of direction as a function of the angular position in which the crankarms 22, 23 are located, and causes a state of stress and a consequent state of strain in the components of the crankset 12.

Hereinafter, with reference to FIG. 2, the right crankarm 22 is considered, it being understood that what will be described is also valid for a left crankarm 23, the changes being within the capabilities of those skilled in the art.

In order to evaluate the stresses and strains of the crankarm 22 due to the application of the force F to the respective pedal 14 in a predetermined angular position, the crankarm 22 may be deemed to be a beam constrained at its pivot end 24 (on the left in FIG. 2), and the pedal 14 to be an element constrained at the free end 28 of the crankarm 22 (on the right in FIG. 2), namely as if the pedal 14 could not rotate with respect to the crankarm 22 and the crankset 12 could not rotate with respect to the bottom bracket 32.

The point of application of the force F can be deemed to correspond with the center O of the surface of the pedal 14 in contact with the foot of the cyclist.

Figure 2:
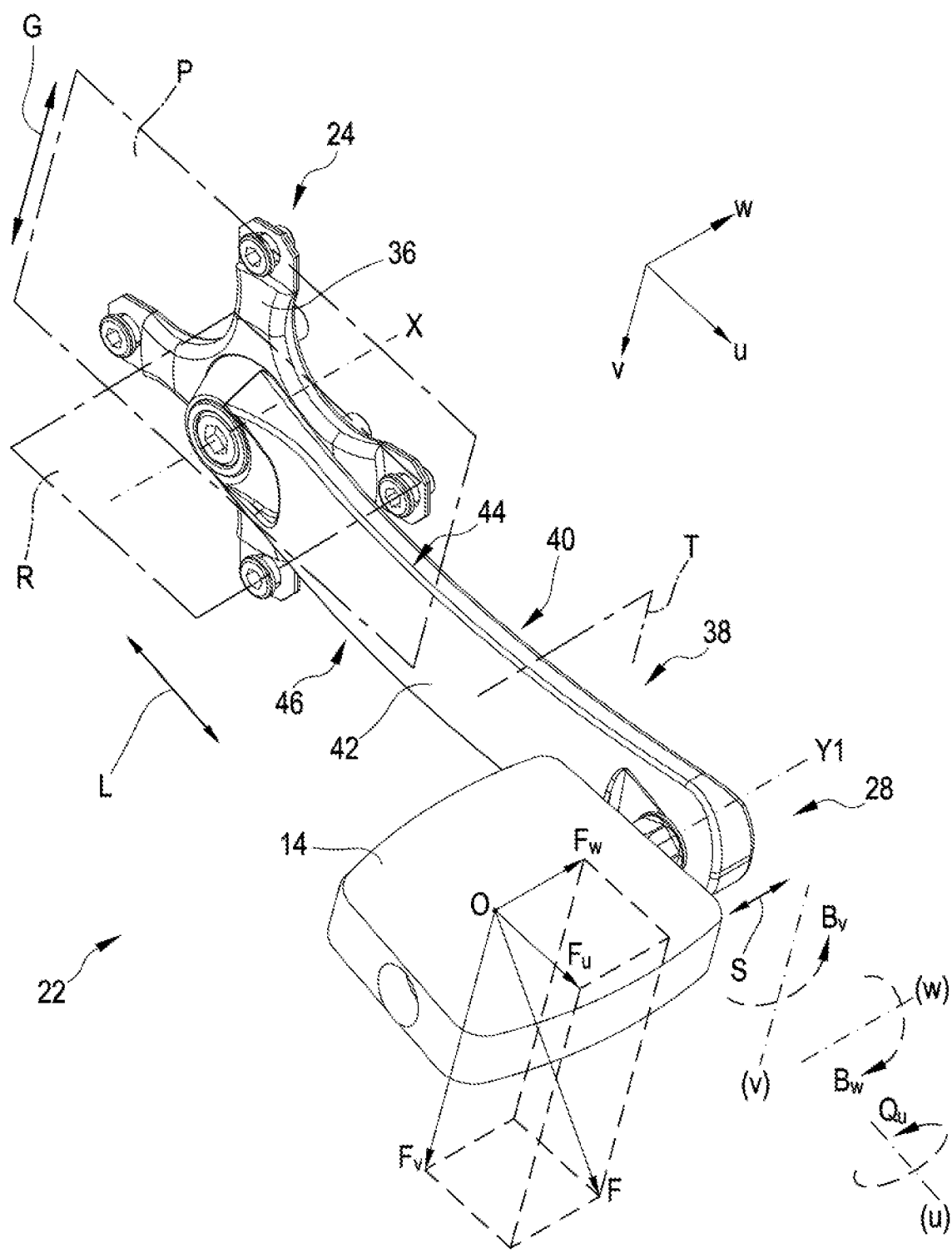
FIG. 2 is a perspective view of a crankarm and associated pedal, with some annotated reference systems.

Considering a generic reference system UVW, wherein the direction U coincides with the length direction L of the crankarm 22, 23 and the direction W is parallel to or coincides with the rotation axis X and with the thickness direction S, and taking the positive directions as arbitrarily shown in FIG. 2, the force F can be generically decomposed into the following components:

a radial or parallel component Fu acting along the length direction L of the crankarm 22, 23, a tangential or perpendicular component Fv, orthogonal to the axes plane or rotary plane R, a lateral component Fw, orthogonal to the rotation plane P of the crankarm 22, and parallel to the rotation axis X and to the pedal axis Y1.

As stated above, the magnitude and the direction of the force F change during pedaling for various reasons, and at any moment, one or more of the components Fu, Fv, Fw could also be oriented in the opposite direction to the one shown.

The tangential or perpendicular component Fv represents the only effective component or useful component for the purposes of pedaling, i.e. that which actually sets the crankarm 22 into rotation.

It should be noted that the tangential or perpendicular component Fv is at maximum magnitude when the crankarm 22 is in such an angular position that the pedal axis Y1 is forward with respect to the rotation axis X in the travel direction; such a phase is called thrusting or propulsion phase and takes place alternately for each crankarm 22, 23. The tangential component Fv causes a bending moment Bw around axis W, which results in a first bending strain, still indicated with Bw.

Figure 3:
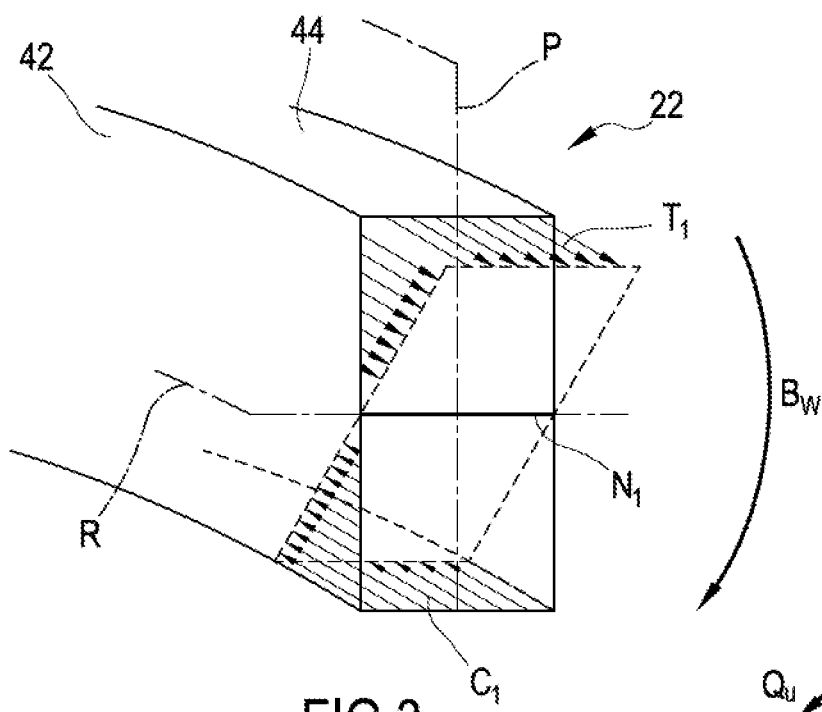
FIGS. 3-5 are schematic illustrations of stresses acting on a cross section of the crankarm.

In greater detail and in a per se well known manner, the bending strain Bw comprises a tensile strain or dilation T1 on one side with respect to the axes plane R (at the top in FIG. 3) and a compressive strain or contraction C1 on the other side of the crankarm 22, 23 with respect to the axes plane R (at the bottom in FIG. 3).

In any cross section of the crankarm 22 it is possible to identify a neutral axis N1 for the bending moment Bw.

As already indicated above, in the present description and in the attached claims, as well as in general in the mechanical field, under "neutral axis" the geometric locus of the points at which the stresses normal to the cross section of the solid—in this case the crankarm 22, 23—under consideration are zero is meant to be indicated.

In general, the position of the neutral axis N1 for the bending moment Bw in the stressed crankarm 22, 23 depends on the characteristics of the material and on the geometry of the cross section, namely on its shape, on whether it is a solid or hollow cross section, etc.

If the crankarm 22, 23 were made of a homogeneously distributed material with solid rectangular cross section (as schematically shown in FIG. 3), the neutral axis N1 for the bending moment Bw would be on the axes plane R (horizontally in FIG. 3).

The neutral axis N1 therefore defines the "border" between the portion of crankarm 22 subjected to tensile strain T1 and the portion subjected to compressive strain C1. The neutral axis N1 can also be regarded as the axis around which the cross section of the crankarm 22 subjected to the bending moment Bw "rotates".

Therefore, the strain in the crankarm 22, 23 associated with the effective component Fv of the force F is more marked—and thus more easily detectable—the further away one is from the neutral axis N1.

Strictly speaking, it should also be observed that, since the point O of application of the force F on the pedal 14 is displaced with respect to the rotation plane P of the crankarm 22, the tangential component Fv of the propulsion force F also causes a torsional moment around the axis U, that causes a torsional strain Qu in the crankarm 22, 23.

Figure 4:
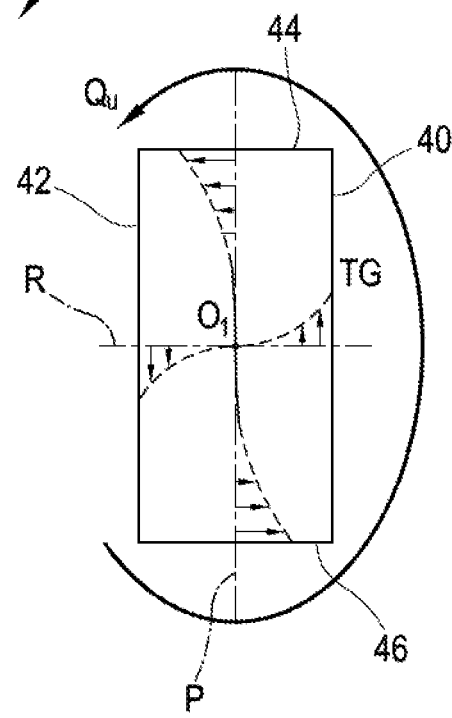

In particular and as shown in FIG. 4, the torsional strain Qu comprises tangential or shearing strains TG that, in a cross section of the crankarm 22, are maximum at the outer periphery and progressively decrease moving towards the center O1 of the cross section of the crankarm 22, until they possibly go to zero.

The radial and lateral components Fu, Fw are ineffective for the purposes of pedaling and therefore represent "lost" components of the force F, which however contribute to straining the crankarm 22, 23.

In particular, the radial component Fu, by virtue of the displacement of the point of application O, and the lateral component Fw cause a second bending moment By and a second bending strain still indicated with Bv, which causes the crankarm 22, 23 to bend towards the frame (in the case of a positive component in the reference system shown).

Figure 5:
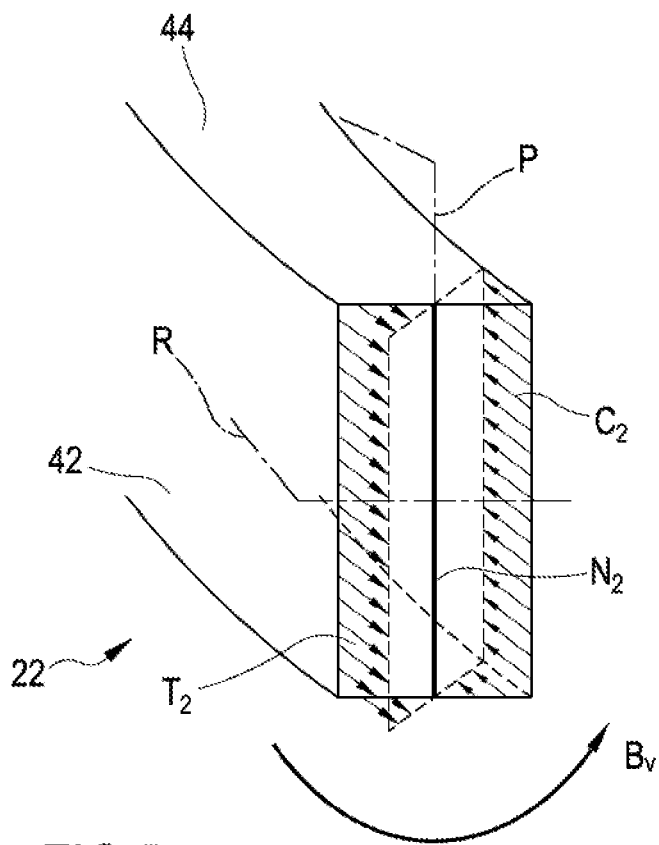

As shown in FIG. 5, the bending strain By comprises a tensile strain T2 and a compressive strain C2 at the two opposite sides of the crankarm 22 with respect to the rotation plane P.

The radial component Fu also causes in the crankarm 22 an axial tensile strain (in the case of a positive component in the reference system shown). Such an axial tensile strain is disregarded hereinafter, since it is typically of negligible size with respect to the aforementioned tensile strain T1 and T2 and compressive strain C1 and C2.

In any cross section of the crankarm 22, 23 it is possible to identify a second neutral axis N2 for the bending moment Bv.

Again if the crankarm 22, 23 were made of a homogeneously distributed material with solid rectangular cross section, as shown by way of an example in FIG. 5, the neutral axis N2 for the bending moment By would be on the rotation plane P of the crankarm 22, 23 (vertically in FIG. 5).

In the case of a crankarm 22, 23 having a non-rectangular cross section and/or a hollow cross section and/or made of non-homogeneous material, like for example a layered composite material, and/or of variable cross section along the length direction L of the crankarm 22, 23, the state of strain in the crankarm 22, 23 is even more complex than what has been described. However, what has been stated in relation to the regions of the crankarm 22, 23 in which the strains are of greater size and, therefore, easier to detect remains valid. Moreover, it is in general possible to identify the aforementioned neutral axes N1, N2, although possibly displaced with respect to the axes plane R and to the rotation plane P, respectively.

Therefore, the evaluation of the force F (for example for a torque meter or a power meter) and in particular of its sole effective component, namely the tangential component Fv, can take place based on the measurement of the aforementioned bending strain Bw. It can be based, alternatively or additionally, on the measurement of the torsional strain Qu.

In some cases it could be useful to also measure the lost radial component Fu and lateral component Fw, for example to measure the lost power with a power meter; in this case, such components can be obtained from the measurement of the bending strain By and of the axial tensile strain.

In yet other cases it may be useful to measure one or more of the various strains described above, for example to obtain useful information for the design of the crankarm 22, 23 and/or other reasons.

The main stresses acting on the spider 36 of the crankarm 22 on the chain side 16 are also substantially bending moments acting in a plane orthogonal to the rotation axis of the crankarm 22, 23 (rotation plane), even if there can also be a linear stress in the direction of the rotation axis (thickness direction) and/or a bending moment around the latter direction.

The bottom bracket spindle 26, as well as the sleeve of the cogset 18 or free wheel body of the monolithic cogset 18, are on the other hand subject mainly to torsion acting around the axis X of rotation—as well as to a bending moment due to the weight of the crankarms 22, 23 associated with its ends, and to the mainly downward direction of the pedaling force F as far as the bottom bracket spindle 26 is concerned, and to the weight of the cogset 18 as far as the free wheel body of the monolithic cogset 18 is concerned.

An instrumentation used to measure strain on a structure or component, in particular a bicycle crankarm, is a strain gage, in particular an electrical resistance strain gage.

A strain gage comprises an insulating flexible support that supports, typically by gluing, a coil-shaped, namely according to a zig-zag of parallel lines, grid, made through a metallic foil (photo-etched strain gages) or a thin metallic wire (metallic wire strain gages).

The strain gage is suitably attached to the component, typically through a suitable adhesive, for example a cyanoacrylate or an epoxy resin.

As is well known, the surface of the component onto which the strain gage is glued should be accurately prepared so that the adhesion of the strain gage thereto is reliable, and unpredictable measurement errors are avoided.

When the component is stressed, for example by the application of an external force like the pedaling force F or forces deriving therefrom, the strain produced on the surface thereof in contact with the strain gage are transmitted to the grid; the consequent strains of the grid cause a change in the electrical resistance thereof.

The sensitivity of the strain gage is much greater in the direction parallel to the branches of the coil—hereinafter briefly indicated as "strain gage direction" or "detection direction" and taken as a reference when speaking of orientation of the strain gage—than in the direction orthogonal thereto: when the electrical conductor forming the coil is stretched, it becomes longer and thinner and its electrical resistance increases, while when it is compressed it shortens and widens, and its electrical resistance decreases.

More in particular, the change in electrical resistance R, not to be confused herein with the rotary plane R, is correlated to the strain through a quantity known as Gauge factor GF: indicating the strain with epsilon, in this case a percentage change in length given by deltaLe/Le wherein Le is the length, the following applies:

$$GF = deltaR/R/deltaLe/Le = deltaR/R/epsilon \quad (1)$$

In order to be able to read the small changes in electrical resistance induced by a strain of the component under measurement and by a consequent strain of the strain gage, a reading circuit is typically used, the output of which is an amplified signal function of such changes in resistance, typically a Wheatstone bridge reading circuit.

As known, a Wheatstone bridge comprises two resistive legs connected in parallel to one another and to a reference voltage; each resistive leg comprises two resistors connected in series. The output of the bridge is the difference in voltage between the two connection points of the series resistors; the coefficient of proportionality between the measured output of the bridge and the known reference voltage correlates the values of the four resistors with each other, values that can be in part known and in part unknown.

Ideally, it is wished for the electrical resistance of the strain gage to change only in response to the strain consequent to the applied force. However, the temperature changes cause various effects. The structure to which the strain gage is glued changes size due to thermal expansion, which is detected as strain by the strain gage. The resistance of the strain gage also changes due to elongation of its material, and also the resistance of the connection wires of the strain gage to the Wheatstone bridge reading circuit changes.

Some commercially available strain gages are made of a constantan or Karma alloy, designed so that the effects of the temperature on the resistance of the strain gage compensate for the change in resistance of the strain gage due to the thermal expansion of the component under measurement. Since different materials have different degrees of thermal expansion, the self-compensation in temperature requires the selection of a particular alloy for each material of a component under measurement; however, this cannot always be done, and in any case represents a burden and a considerable constraint.

In a strain gage that is not self-compensated, the thermal effects on the other hand cause a strain, called apparent strain.

For the detection of the torsion stresses and/or torsional strains, typically four electrical strain gages are provided for, arranged in pairs on the same cross section transversal to the axis around which the twisting moment acts and in diametrically opposite positions, two on right-handed helixes inclined by 45°, the other two on left-handed helixes again inclined by 45° (or substantially in such positions, in the case of a non-cylindrical component); due to the torsional strains, a pair of strain gages extends so that the electrical resistance increases, while the other pair shortens with consequent decrease in resistance; the resistance changes are measured by a Wheatstone bridge circuit in full bridge configuration, namely the legs of which consist of four strain gages; the imbalance or output of the bridge is proportional to the twisting moment to be measured. Theoretically, the thermal effects cancel each other out, and thus are compensated.

For the detection of bending strains and bending moments, various configurations are known.

In the most common case, two strain gages are applied on opposite faces of the component under measurement, oriented parallel to one another, whereby the second strain gage measures a bending strain equal in magnitude and opposite in sign to that measured by the first one. The changes in resistance are measured by a Wheatstone bridge circuit in half-bridge configuration, namely in which the two strain gages constitute the two series resistors of a leg of the bridge. The output of the bridge is a measurement equal to twice the bending strain on each face. Theoretically the thermal effects cancel each other out, and are thus compensated. This configuration is also suitable for measuring tensile stresses and strains.

The connection of strain gages in a single Wheatstone bridge is done in such a way that the components due to the stresses that are not wished to be detected and due to the thermal effects are subtracted and/or that the components due to the stresses that are wished to be detected are added, in order to obtain an output of larger value.

However, in practice, a Wheatstone bridge is unlikely balanced (i.e. it is unlikely for its output to be zero) when no stress is applied to the component under measurement. Indeed, the completion resistors (namely the two/three resistors of known value and substantially insensitive to strain and temperature that are present besides the strain gages in the half-bridge/quarter-bridge configurations), the resistance of the wires for connection of the strain gages to the reading circuit, the stress caused by gluing of the strain gage to the component under measurement, and possible other components, generate an initial deviation or offset.

Although it is possible to compensate for this deviation through a compensation circuit, typically the compensation of this deviation or offset takes place at the software level, in a processor or strain gage control unit that directly provides the value of the strain along one or more preselected directions.

In the case of a component of a bicycle transmission 10, in particular a crankarm 22, 23, the airflow that flows over the component especially in conditions of high speed traveling can cool down its side exposed to the headwind even by a few Celsius degrees with respect to the non-exposed side. Other temperature differences can be due to other factors, and this applies in particular in the case of crankarms 22, 23 or other components made of composite material, due to the low thermal conductivity thereof. Moreover, in the case of composite material, the thermal dilation is greatly dependent on the local characteristics of the material, such as the actual orientation of the fiber, actual density of the fiber, actual density of the polymeric material, etc., besides of course on the local geometric characteristics such as wall thickness and similar.

Consequently, the output signal of a strain gage can also be greatly influenced by the local temperature of the component to which it is applied.

As already observed in the introductory part of the present document, it is possible to compensate for the thermal effects in a stress/strain sensor or non-self-compensated strain gage using a temperature sensor. The temperature measurement taken with the temperature sensor is used to compensate for the stress/strain measurement, typically directly by the control unit or Wheatstone bridge reading circuit.

It is therefore preferable for the two sensors (that for stresses/strains and that for temperature) to be thermally matched, in particular both arranged in a substantially isothermal region, and for the temperature measurement to be as accurate as possible.

However, the temperature measurement is in general in turn disadvantageously influenced by the mechanical stresses acting in the component under measurement, which on the other hand play an extremely important role for the stress/strain sensor.

When the temperature sensor is arranged in a plane not coinciding with and not parallel to—and preferably orthogonal to, or substantially orthogonal to—that of the stress/strain sensor, it is possible to align the stress/strain sensor in a conventional manner so that its response to the mechanical stresses is maximum—arranging it in practice aligned with the direction in which the stress/strain to be detected is maximum—at the same time allowing an alignment of the temperature sensor according to a direction in which the stress/strain is smaller or even minimum. The output signal of the temperature sensor is therefore a function of only the temperature alone, and is affected little or even not affected by any apparent component, due to direct mechanical dilations or contractions of its sensitive elements.

Given the critical issues highlighted above, once the desired positioning of the stress/strain sensor in the bicycle component has been established, and the desired positioning of the temperature sensor in the bicycle component has been established, it is suitable for them to be effectively positioned in the most precise way possible.

Figure 6:
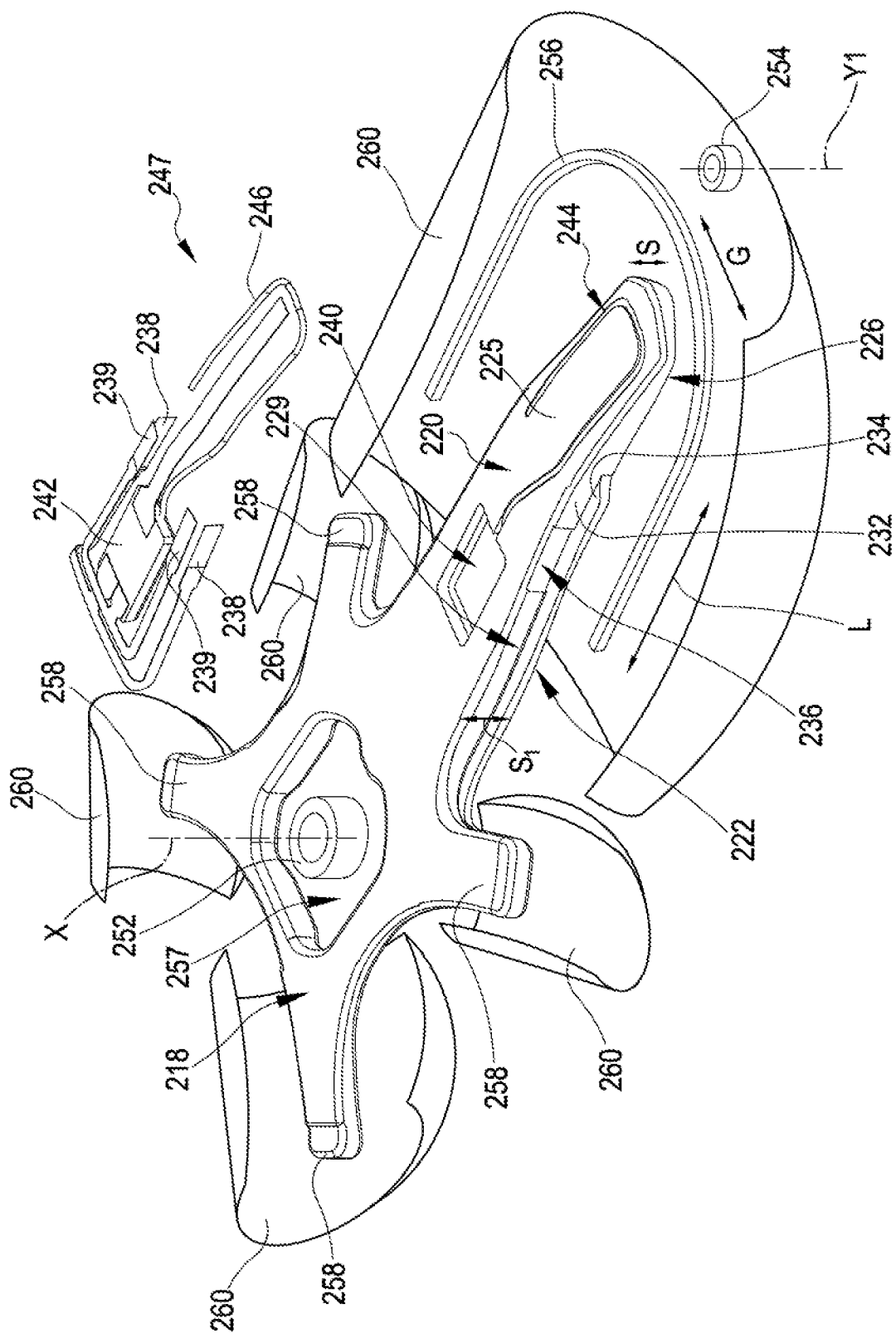
FIGS. 6-7 are perspective views of a crankarm in different processing steps.
Figure 7:
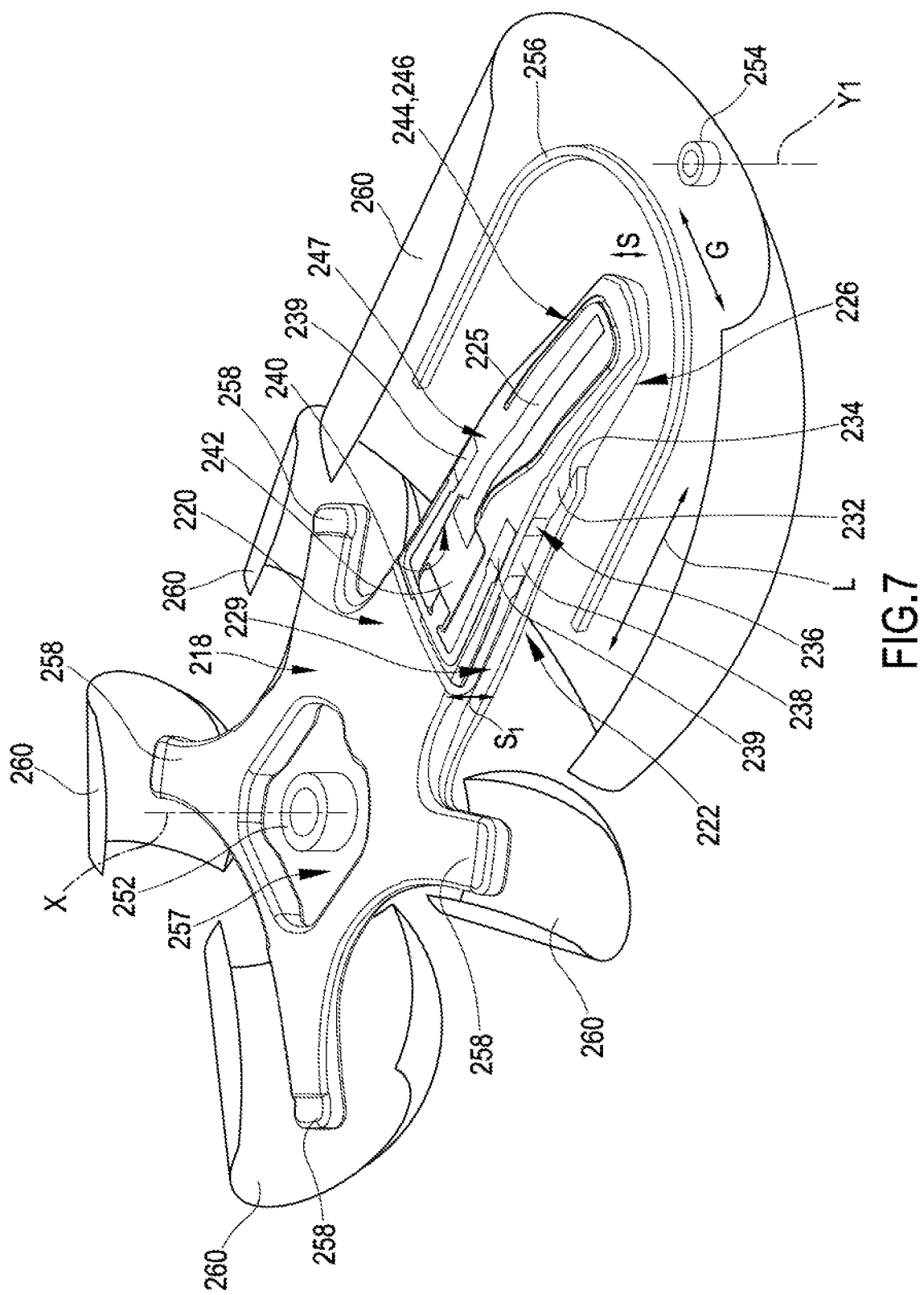

For this purpose, the following method, described with reference to FIGS. 6-7 wherein the bicycle component is a crankarm 22, may be particularly useful, especially in the case of a bicycle component made of composite material. In particular a crankarm on the transmission side (typically a right crankarm) is shown, but those skilled in the art will understand how to simplify the manufacturing process in the case of a crankarm on the side opposite to the transmission side, which is devoid of spider 36.

In order to manufacture the crankarm 22 a shaped rigid core 218 is used, preferably intended to be later removed as described hereinbelow, and the shape of which may therefore determine the shape of a cavity (not shown) inside the finished crankarm 22.

The expressions "length direction", "width direction", "thickness direction", "proximal face" and "distal face" are used with reference to the core 218 in an analogous way to what has been defined above with reference to the crankarm 22.

In particular the core 218, at least in a longitudinally central region thereof, has a first region 220 (central in the width direction) that has a maximum thickness S1 (constant or anyway little and steadily variable), and two projections from one side and the other in the width direction G, only one of which, indicated with reference numeral 222, is visible.

Each projection 222 is flush with a face of the core 218, preferably with the proximal face 226 of the core.

In the transition from each projection 222 to the central region 220, a step 229 is therefore defined, having a riser surface 232 and a "tread" surface 234, preferably orthogonal or approximately orthogonal to one another. The "tread" surface 234 is part of the projection 222 and extends substantially along the length direction L and along the width direction G. The riser surface 232 is part of the central region 220 and extends substantially along the length direction L and along the thickness direction S. The riser surface 232 is therefore essentially orthogonal to the distal face 225.

The core 218 comprises grooves and/or recesses intended to house electrical/electronic components in a predetermined and more protected position, such as integrated circuit boards, flexible circuits and/or connection cables between electronic components internal and/or external to the finished crankarm.

In the case shown there are provided recesses 236 for stress/strain sensors 238 and/or for temperature sensors 239, preferably on the riser surfaces 232 of the steps 229, a recess 240 for a printed circuit board or PCB 242, a recess 244 for cables and/or flexible circuits 246, preferably on the distal face 225, a circular recess (not visible) to define the position of an evacuation hole described hereinafter, preferably on the proximal face 226.

In the manufacturing process of the crankarm 22, indeed, one or more stress/strain sensors 238 are first fixed on the riser surface 232 of the rigid core 218, preferably in a stable, but temporary manner, within the recesses 236. The meaning of the expression "stable, but temporary" will become clear upon reading the present description.

Said other sensors 239, the cables and/or flexible circuits 246 and/or the PCB 242—suitably treated as described in a patent application filed on the same date by the same Applicant and titled "Bicycle component made of composite material and related manufacturing process", incorporated herein by reference—can also be fixed to the core 218.

Advantageously, as shown, the components 238, 239, 242, 246 form a pre-assembled instrumentation body 247; FIG. 7 shows the core 218 and the instrumentation body 247 in the fixing condition of the instrumentation body 247 to the core 218.

It should be noted that the temperature sensors 239 of the instrumentation body 247 are fixed on the distal face 225 of the core 218, possibly providing for specific recesses (not shown). However, there could be, alternatively or additionally to the recesses 236 on the riser surface 232 of the rigid core 218, recesses on the tread surface 234 of the steps 229 of the core 218 for receiving these sensors 239.

In the instrumentation body 247, the position and the orientation of the stress/strain sensor(s) 238 and of the temperature sensors 239 could be reversed, in which case the stress/strain sensor(s) 238 would be arranged on the tread surface 234 or on the distal face 225 of the rigid core 218, preferably in recesses (not shown) suitably positioned to receive them.

The stress/strain sensor(s) 238 and/or the temperature sensor(s) 239 can also be arranged on the proximal face 226 of the rigid core 218, preferably in recesses (not shown) suitably positioned to receive them.

It should be noted that both the stress/strain sensors 238 and the temperature sensors 239 are oriented along the length direction L of the crankarm 22.

In this way, the stress/strain sensor 238 has the optimal alignment for the detection of the traction and/or compression stresses due to the pedaling force F.

It should also be noted that the stress/strain sensor 238 and the temperature sensor 239 of each pair (those associated with each step 229 of the core 218) are arranged substantially in the same position along the length direction L of the crankarm 22, and are sufficiently close as to be in a region of the crankarm 22 that is substantially isothermal even at high speeds.

In any case, the stress/strain sensor 238 and the temperature sensor 239 of each pair are associated at least from the logic point of view, and preferably are thermally matched.

The bottom bracket spindle 26, or a portion thereof, and the pedal pivot 34 (FIG. 1), or corresponding metallic bushes 252, 254, possibly internally threaded, or also threaded inserts (masters) for making holes for such spindles/pivots, are positioned at the two ends of the core 218.

Thereafter, a "cord" of composite material 256 preferably comprising substantially unidirectional structural fiber is positioned in the recess determined by each step 229, wherein the direction of the unidirectional fiber is substantially aligned with the length direction L of the crankarm 22. The cord 256 can be formed of one or more rolled up plies of composite material, or it can comprise a braid or similar of dry unidirectional fiber, which is impregnated with polymeric material prior to the insertion in a mold, or impregnated with polymeric material during molding. A single looped cord 256 can be used, or two cords can be used, each on one side of the core 218. The cord 256 can also be partially hardened.

It should be noted that the stress/strain sensor 238 (and/or the temperature sensor 239) are in contact with the cord 256: this can be particularly advantageous to improve the elongation/contraction detection reliability because they turn out to be extended according to the direction of the fibers of the composite material. Moreover, if both a stress/strain sensor 238 and a temperature sensor 239 contact the same cord 256 because they are arranged on the tread surface 234 and the riser surface 232 as said above, this configuration aids the same temperature to be maintained at the two sensors.

Thereafter, one or more other plies 260 of composite material of any of a variety of types are wound on the structure thus prepared.

Like the cord 256, also the plies 260 may or may not be pre-impregnated, in the latter case the polymeric material being subsequently injected into the mold.

Alternatively to the cord 256 and to the plies 260 of composite material, non-ply composite material can be used, as stated above.

The structure is inserted in the mold and the composite material is consolidated, subjecting it to a suitable temperature and pressure profile. The material of the core 218 should be suitably selected so as to withstand the molding pressure and temperature, keeping its shape until hardening of the composite material, still ensuring precise positioning of the stress/strain sensor(s) 238 (as well as of the temperature sensors 239 and of the PCB 242) inside the finished crankarm 22, in particular inside the inner cavity if the core 218 is removed.

After the extraction from the mold, the aforementioned evacuation hole (not shown) can be made, for example on the proximal face 226 of the crankarm 22, and the core 218 can be suitably melted and allowed to pour out through the hole. For this purpose, the core 218 is in particular made of a low melting point metallic alloy, the melting point of which is less than 140° C.

The melting process of the alloy takes place in particular—as known for example from document EP1818252A1, incorporated herein by reference—, by placing the semi-finished product in an oil bath at a higher temperature than the melting point of the alloy. In this way, melting of the core 218 takes place without the composite material being damaged by too high temperatures.

The fixing of the stress/strain sensor(s) 238 (as well as of the temperature sensor(s) 239) to the core 218 should be such as to keep it/them in position during the assembly of the structure to be molded and during molding, but it should have a lower cohesion force than that which is established between said components and the composite material, so that, when the core 218 is extracted, those components remain fixedly connected to the crankarm.

On the other hand, it is proper for the cables and/or flexible circuits 246, a length of which has to be brought out through the evacuation hole, not to adhere at all to the crankarm 22, at least at their free end portion.

The fixing of said PCB 242 and/or of the cables and/or flexible circuits 246 to the core 218 should similarly be such as to hold them in position during the assembly of the structure to be molded and during molding, and such that they are not dragged away by the molten core 218 coming out from the evacuation hole, but on the one hand the same precision of positioning of the stress/strain sensor(s) 238 (and of the temperature sensor(s) 239) is not required, on the other hand it is not strictly necessary for said elements 242, 246 to adhere to the inner surface, exposed into the cavity of the finished crankarm 22—although it is greatly preferred so as to avoid noises and bouncing with consequent manifest problems during the use of the crankarm 22.

However, the preferred configuration of pre-assembled instrumentation body 247 advantageously also makes it easier to keep the various electrical/electronic components in position.

Following the evacuation of the material constituting the core 218, if provided for, the evacuation hole can be suitably plugged, preferably in a tight manner.

The inner cavity of the crankarm 10 thus formed can be finished thereafter by removing the possible metal residuals remaining after melting through an acid wash, provided that it does not damage the stress/strain sensor(s) 238 and the temperature sensor(s) 239.

The crankarm 22 can be subjected to a further finishing cycle of the outer surface, for example by subjecting it to sandblasting, and the manufacture ends with the fixing of possible metallic parts provided on the crankarm 22.

For example, one or more chainrings 30 are fixed, typically by gluing, to a spider 36 thereof. Indeed, the rigid core 218 comprises, on the side of the rotation axis X of the finished crankarm, a central hole 257 and projections 258 extending radially around the hole 257, which will define extensions of the inner cavity of the crankarm 22 inside a corresponding number of spider legs 36 thereof (FIG. 1), extending radially around the metallic bush 52. The number of projections 258, respectively spider legs 36 of the crankarm 22 is not necessarily equal to four as shown.

It should be emphasized that, by the manufacturing process illustrated above, said at least one stress/strain sensor 238 and said at least one temperature sensor 239 (as well as other electrical/electronic components) is therefore co-molded with the composite material of the crankarm 22, namely the crankarm 22 is molded, as a single piece, with said sensors 238, 239 already inserted thereinside.

The crankarm 22 therefore has, integrated in its main body, said at least one stress/strain sensor 238, said at least one temperature sensor 239, and possibly the other electrical/electronic components.

Said at least one stress/strain sensor 238, said at least one temperature sensor 239 (and possibly the other electrical/electronic components) is therefore advantageously enclosed in the composite material that forms the crankarm 22, and very well protected thereby against collisions, water, dirt and atmospheric agents.

The electrical/electronic components housed in the crankarm should be such as to withstand the pressure and temperature profile of the molding process—more critical in the case of composite material with thermosetting polymeric material than in the case of composite material with thermoplastic polymeric material—, as well as the acid wash if carried out, possibly when suitably protected.

It is worthwhile emphasizing that said at least one stress/strain sensor 238 and said at least one temperature sensor 239, or some of them, can also be connected after the molding of the crankarm 22, and in particular fixed to the outer surface of the crankarm 22.

Alternatively, it is possible to provide a core 218 suitably designed and made to be kept seated, inside the finished crankarm 22, after molding is complete. In this case, it defines anyway a sort of inner cavity within the composite material forming the shell or outer cladding of the crankarm 10.

The core that stays in the finished crankarm can be provided in a particularly light material, like for example high-density polypropylene or hardened composite material (which may or may not be the same as the composite material forming the shell of the crankarm 22), or in the form of a framework suitably configured for and having such a stiffness as to ensure the correct positioning of said at least one stress/strain sensor 238 (and of said temperature sensors 239) in the finished crankarm.

In the finished crankarm 22, said at least one stress/strain sensor 238, said at least one temperature sensor 239, and the other electrical/electronic components do not turn out to be exposed, and are moreover sealed in an impermeable manner, protected against a possible entry of water and/or dirt in the cavity of the crankarm 22.

Finally, given that said at least one stress/strain sensor 238 and said at least one temperature sensor 239 (and the other electrical/electronic components) are totally concealed from view, the appearance of the crankarm 22 is substantially improved.

It is also possible to arrange composite material between the core 218 and said at least one stress/strain sensor 238 and/or said at least one temperature sensor 239, so as to obtain a crankarm 22 provided with a cavity in which said at least one stress/strain sensor 238 and/or said at least one temperature sensor 239 is immediately adjacent to the cavity, still being completely surrounded by the composite material. If on the one hand this process helps to keep in position said at least one stress/strain sensor 238 and/or said at least one temperature sensor 239 after molding, and to protect it from possible infiltrations in the cavity, on the other hand during molding said at least one stress/strain sensor 238 and/or said at least one temperature sensor 239 can move more than when it/they is/are fixed temporarily to the core and/or housed in a recess of the core, for which reason the positioning of said at least one stress/strain sensor 238 and/or of said at least one temperature sensor 239 and of the other electrical/electronic components in the crankarm 22 turns out to be less precise.

Figure 8:
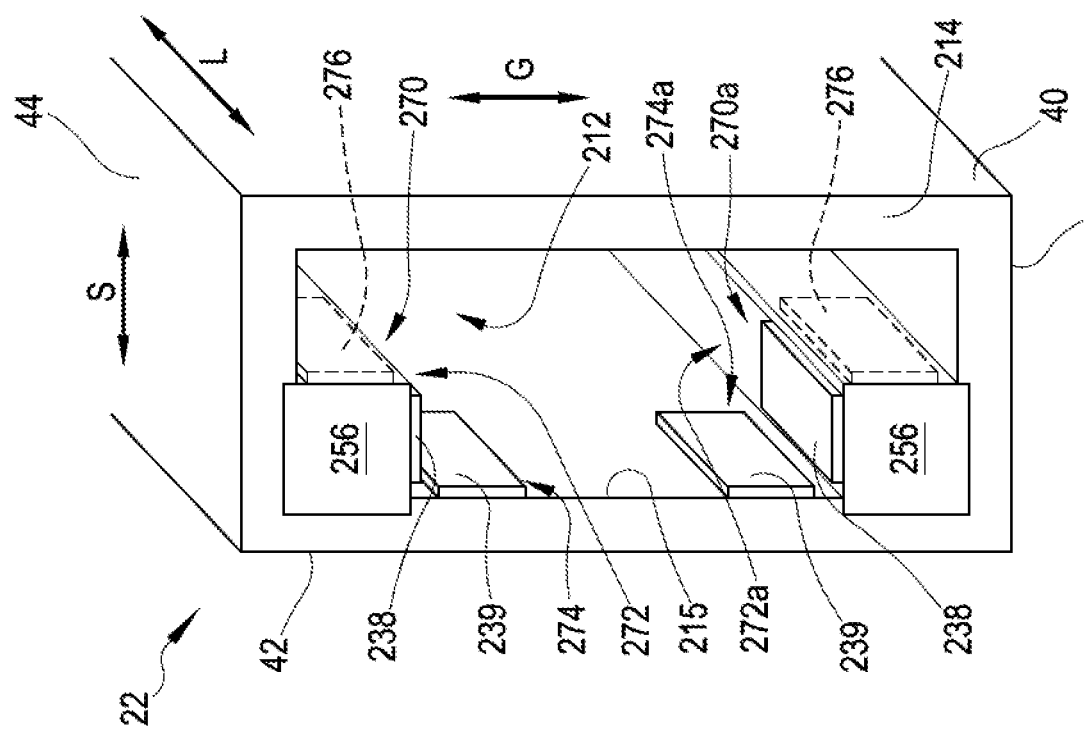
FIGS. 8 and 9 are perspective cross sectional views of a crankarm, seen from the free end, made with the process of FIGS. 6-7, according to two alternatives.
Figure 9:
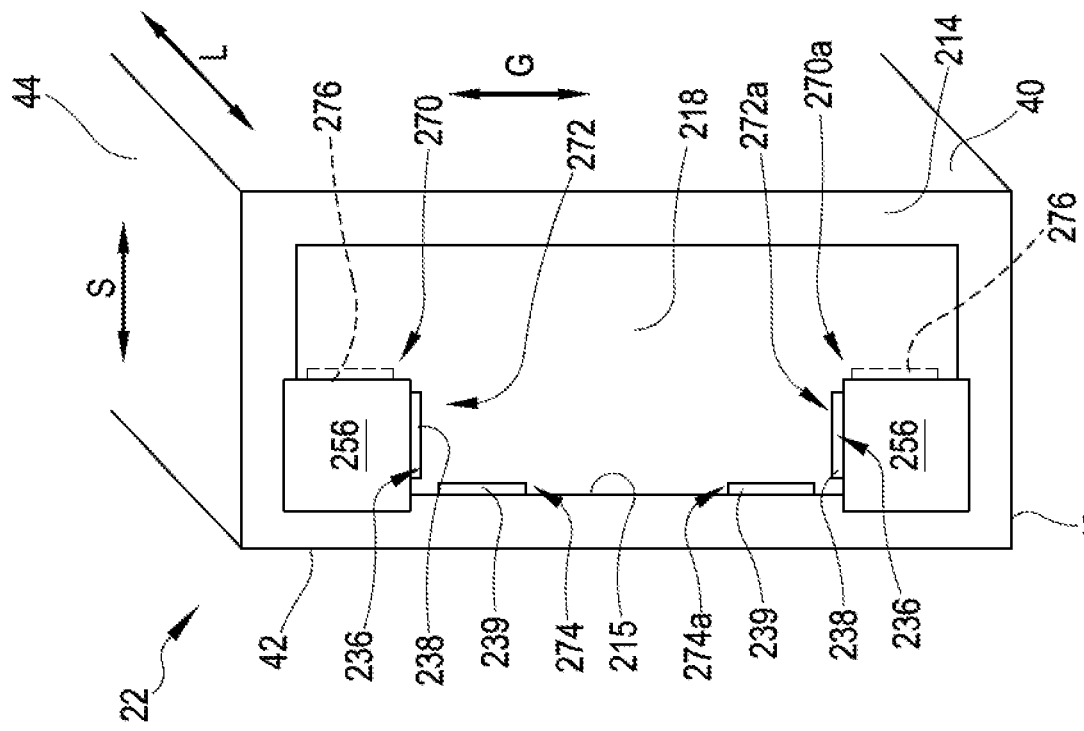

FIG. 8 illustrates a perspective cross sectional view of the crankarm 22 obtained with the aforementioned process, after the removal of the core 218, carried out at a position along the length direction of the crankarm 22 at which the sensors 238, 239 are applied. FIG. 9 illustrates an analogous view of a crankarm 22, wherein the core 218 is not removed.

It is possible to see the cavity 212 left by the core 218, or respectively the core 218, the shell 214 of composite material around the cavity 212 or respectively around the core 218, and the cords 256 (or pieces of one same cord).

The cords 256 form two inner projections 270, 270a, formed at the two longitudinal edges of the distal face of the inner surface of the shell 214 of composite material. Every projection 270, 270a extends along the length direction L of the crankarm 22.

It is possible to see the stress/strain sensors 238 that, having been applied to the riser surface 232 of the core 218, are now arranged on a respective first region 272, 272a of the inner surface 215 of the shell 214 substantially extending along the length direction L and along a thickness direction S, and made on a respective projection 270, 270a. They are substantially parallel to one another.

It is also possible to see the temperature sensors 239 that, having been applied to the distal surface of the core 218, are now arranged on a respective second region 274, 274a of the inner surface 215 of the shell 214, substantially extending along the length direction L and along a width direction G of the crankarm 22; the second region 274, 274a is adjacent and substantially orthogonal to the surface of the projection 270, 270a. They substantially lie in one and the same plane.

It is worthwhile emphasizing that the positions of the stress/strain sensors 238 and of the temperature sensors 239—or the positions of the stress/strain sensor 238 and of the temperature sensor 239 on the side of a single projection 270, 270a—can be reversed.

With a broken line, reference numeral 276 indicates an alternative position for the temperature sensors 239 when the stress/strain sensors 238 stay in the indicated position; i.e. an alternative position for the stress/strain sensors 238, in which case the temperature sensors 239 take up the position indicated in FIGS. 8 and 9 for the stress/strain sensors 238.

FIGS. 10 and 11 differ from FIGS. 8 and 9 in that the cords 256 are not used; however, the projections 270, 270a formed by the composite material that forms the shell 214 are present.

FIGS. 8-11 show stress/strain sensors 238 and temperature sensors 239 in specific positions inside the cross section of the crankarm 22. It should however be understood that their positioning in the transversal direction to the crankarm 22 can be whatever, both on the outer surface of the crankarm 22 and inside the cross section (section plane T) delimited by such an outer surface. In greater detail, each one of the at least one stress/strain sensor 238 and the at least one temperature sensor 239 can be applied to an outer surface of the crankarm 22, to a surface 215 exposed in an inner cavity 212 of the crankarm, and/or be incorporated in the material of the crankarm 22, in particular it can be co-molded with the composite material itself in the case of a crankarm 22 made of composite material.

In the merely illustrative case shown, the stress/strain sensors 238 are shown arranged in planes parallel to the upper face 44 and to the lower face 46 of the crankarm 22. However, it should be understood that they could be applied to another of the faces of the crankarm 22 or parallel to another of the faces of the crankarm 22 or even be arranged in a plane forming an acute angle with one of the faces of the crankarm 22.

In the merely illustrative case shown, the temperature sensors 239 are shown arranged in planes parallel to the proximal face 40 and to the distal face 42 of the crankarm 22. It should however be understood that they could be applied to another of the faces of the crankarm 22, or parallel to another of the faces of the crankarm 22, or even be arranged in a plane forming an acute angle with one of the faces of the crankarm 22.

However, a stress/strain sensor 238 and a temperature sensor 239 associated therewith, preferably thermally matched thereto, must lie in planes not coinciding with each other and not parallel to one another, preferably substantially orthogonal to each other as shown, in order to obtain the advantages outlined in the introductory part of the present disclosure.

With the preferred configuration shown, the stress/strain sensor 238 is arranged in a plane parallel to the neutral plane N1 (FIG. 3) with respect to the main stress/strain to be detected, which is the one directly consequent to the application of the force F to the pedal 14 of the crankarm 22 itself, but alternatively it can be arranged in a plane forming any angle with such a neutral plane N1.

Preferably, the first and the second stress/strain sensor 238 are positioned on opposite sides with respect to a plane comprising the pedal axis Y1 and the rotation axis X of the crankarm 22. They are also advantageously each arranged as far as possible from the neutral plane or axis N1 (FIG. 3) with respect to the main stress/strain to be detected.

As stated several times, the stress/strain sensor 238 and the temperature sensor 239 described above can be intended for use in a power meter or a torque meter. From the mathematical point of view, as already described above, the pedaling power is the useful component of the power delivered by the cyclist, given by the torque applied on either or both of the pedals 14, 15, multiplied by the angular speed of the respective crankarm 22, 23.

The torque is in turn given by the product of the force component Fv in the tangential direction by the arm, which substantially corresponds to the length of the crankarm 22, 23.

The angular speed is typically provided by a cadence sensor. Alternatively, the angular speed can be obtained by an accelerometer that detects the pedaling cadence from the alternation of the force of gravity with respect to the rotary plane R of the crankarm 22, 23.

Alternatively, the angular speed of the crankset 12 and therefore of the crankarm(s) 22, 23 can be calculated from the bicycle speed, in turn possibly determined by a cadence sensor applied to a wheel, and from the current gear ratio.

The data relative to the applied torque is collected by the power meter at the crankset 12.

The invention can apply to a symmetrical torque or power detection system, comprising two sub-systems made at each crankarm 22, 23 of the crankset, or to a non-symmetrical torque or power detection system, comprising one sub-system at the crankarm 22 on the transmission side and the other sub-system at the bottom bracket spindle 26 (to detect torque or power applied onto the pedal on the side opposite to the transmission side), or furthermore to a torque or power detection system made at only the crankarm 22 on the transmission side. In this last case, the torque or power delivered by the cyclist is estimated as double that measured.

Although the invention has been described in detail with reference to strain gages, the invention can also be applied to different types of stress/strain sensors, for example piezoelectric sensors.

The above is a description of various embodiments of inventive aspects, and further changes can be made without departing from the scope of the present invention. The shape and/or size and/or location and/or orientation of the various components and/or the succession of the various steps can be changed. The functions of an element or module can be carried out by two or more components or modules, and vice-versa. Components shown directly connected to or contacting each other can have intermediate structures arranged in between them. Steps shown directly following each other can have intermediate steps carried out between them. The details shown in a figure and/or described with reference to a figure or to an embodiment can apply in other figures or embodiments. Not all of the details shown in a figure or described in a same context must necessarily be present in a same embodiment. Features or aspects that turn out to be innovative with respect to the prior art, alone or in combination with other features, should be deemed to be described per se, irrespective of what is explicitly described as innovative.

What is claimed is:

1. A bicycle component comprising a stress/strain sensor aligned according to a direction of stress/strain to be detected, and a temperature sensor associated with said stress/strain sensor, wherein said stress/strain sensor and said temperature sensor are on the same bicycle component and lie in planes that do not coincide with one another and are not parallel to each another, and said bicycle component further comprising a cavity and a shell of composite material comprising structural fiber incorporated in a polymeric matrix extending around said cavity, wherein the stress/strain sensor is arranged on a first region of an inner surface of the shell, the temperature sensor is arranged on a second region of the inner surface of the shell, said first region and said second region are substantially orthogonal to each other, and, wherein the shell has an inner projection and at least one of the first region or the second region is on said inner projection.

2. The bicycle component according to claim 1, wherein said planes are substantially orthogonal to each other.

3. The bicycle component according to claim 2, wherein said stress/strain sensor has a detection direction aligned according to the direction of said stress/strain to be detected, and the plane in which said temperature sensor lies is not orthogonal to said detection direction of said stress/strain sensor.

4. The bicycle component according to claim 1, wherein said temperature sensor is thermally matched to said stress/strain sensor.

5. The bicycle component according to claim 1, wherein said stress/strain sensor and said temperature sensor are positioned in a substantially isothermal region of the bicycle component.

6. The bicycle component according to claim 1, wherein at least said first region extends along a direction of stress/strain to be detected.

7. The bicycle component according to claim 6, wherein the component is oblong and the first region substantially extends along a length direction (L) and along a thickness (S) of the component, and wherein the second region substantially extends along the length direction (L) and along a width (G) of the component.

8. The bicycle component according to claim 1, further comprising a second stress/strain sensor and a second temperature sensor, lying in planes not coinciding with one another and not parallel to each other.

9. A bicycle component comprising a first stress/strain sensor aligned according to a direction of stress/strain to be detected, and a first temperature sensor associated with said first stress/strain sensor, wherein said first stress/strain sensor and said first temperature sensor are on the same bicycle component and lie in planes that do not coincide with one another and are not parallel to each another, and a second stress/strain sensor and a second temperature sensor, lying in planes not coinciding with one another and not parallel to each other, wherein the first stress/strain sensor and the first temperature sensor are applied on first and second regions of an inner surface of a shell of composite material comprising structural fiber incorporated in a polymeric matrix and having an inner projection, and the second stress/strain sensor is arranged on a third region of an inner surface of the shell, the second temperature sensor is arranged on a fourth region of the inner surface of the shell, said third region and said fourth region being substantially orthogonal to each other, wherein the first region and the second region are made at a first inner edge of the shell and the third region and the fourth region are made at a second inner edge of the shell adjacent to the first edge, wherein the shell has a second inner projection, along the second inner edge of the shell, and at least one of the third region or the fourth region is made on said second projection.

10. The bicycle component according to claim 9, wherein the first and the second stress/strain sensors lie in planes substantially parallel to one another, and wherein the first and the second temperature sensors lie substantially in a same plane.

11. A bicycle component comprising a stress/strain sensor aligned according to a direction of a stress/strain to be detected, and a temperature sensor associated with said stress/strain sensor, wherein said stress/strain sensor and said temperature sensor lie in planes that do not coincide with one another and are not parallel to each another, wherein said stress/strain sensor and said temperature sensor are applied on first and second regions of an inner surface of a shell that is formed of composite material comprising structural fiber incorporated in a polymeric matrix, said shell having an inner projection, and said first region and said second region of the inner surface of the shell are substantially orthogonal to each other and at least one of said first region or said second region is defined on said inner projection.

12. The bicycle component according to claim 11, wherein at least said first region extends along a direction of stress/strain to be detected.

13. The bicycle component according to claim 11, wherein the component is oblong and the first region substantially extends along a length direction (L) and along a thickness (S) of the component, and wherein the second region substantially extends along the length direction (L) and along a width (G) of the component.

14. A bicycle component comprising a stress/strain sensor aligned according to a direction of a stress/strain to be detected, and a temperature sensor associated with said stress/strain sensor, wherein said stress/strain sensor and said temperature sensor lie in planes that do not coincide with one another and are not parallel to each another, wherein said stress/strain sensor and said temperature sensor are applied on first and second regions of an inner surface of a shell that is formed of composite material comprising structural fiber incorporated in a polymeric matrix, and said first region and said second region of the inner surface of the shell are substantially orthogonal to each other.

15. The bicycle component according to claim 14, further comprising a core, and a shell of composite material comprising structural fiber incorporated in a polymeric matrix extending around said core, at least one of the stress/strain sensor or the temperature sensor being arranged between the core and the shell.

16. The bicycle component according to claim 15, wherein said core comprises at least one recess, and at least one of the stress/strain sensor or the temperature sensor is arranged in said at least one recess.

17. The bicycle component according to claim 14, wherein the bicycle component is a crankarm comprising a main body extending along a length direction (L) between a rotation axis (X) and a pedal axis (Y1, Y2), said main body carrying said stress/strain sensor and said temperature sensor.

18. The bicycle component according to claim 14, wherein said planes are substantially orthogonal to each other.

19. The bicycle component according to claim 14, wherein said temperature sensor is thermally matched to said stress/strain sensor.

20. The bicycle component according to claim 14, wherein said stress/strain sensor and said temperature sensor are positioned in a substantially isothermal region of the bicycle component.

\* \* \* \* \*